United States Patent
Zhang

(10) Patent No.: US 7,983,493 B2
(45) Date of Patent: Jul. 19, 2011

(54) ADAPTIVE OVERLAPPED BLOCK MATCHING FOR ACCURATE MOTION COMPENSATION

(75) Inventor: Jun Zhang, Huntington Station, NY (US)

(73) Assignee: VectorMAX Corporation, Farmingdale, NY (US)

( * ) Notice: Subject to any disclaimer, the term of this patent is extended or adjusted under 35 U.S.C. 154(b) by 1453 days.

(21) Appl. No.: 11/244,413

(22) Filed: Oct. 5, 2005

(65) Prior Publication Data

US 2006/0083310 A1    Apr. 20, 2006

Related U.S. Application Data

(60) Provisional application No. 60/615,989, filed on Oct. 5, 2004.

(51) Int. Cl.
- *G06K 9/36* (2006.01)
- *G06K 9/46* (2006.01)
- *H04N 11/02* (2006.01)
- *H04N 11/04* (2006.01)
- *H04N 7/12* (2006.01)

(52) U.S. Cl. .................. 382/232; 382/236; 375/240.16

(58) Field of Classification Search ............. 375/240.01, 375/240.12–240.17; 382/232, 236
See application file for complete search history.

(56) References Cited

U.S. PATENT DOCUMENTS 6,061,401 A * 5/2000 Jung ............................ 375/240

FOREIGN PATENT DOCUMENTS

EP          0 070 382 A1    7/1996

OTHER PUBLICATIONS

Su and Mesereau, Motion Estimation Methods for Overlapped Block Motion Compensation, IEEE Transactions on Image Processing, Sep. 2000, pp. 1509-1521, vol. 9, No. 9, IEEE.
EP Examination Report for corresponding European Application No. 05805978.3 dated Dec. 17, 2010.
Rajesh Rajagopalan et al; "Motion Optimization of Ordered Blocks for Overlapped Block Motion Compensation" IEEE Transaction on Circuits and Systems for Video Technology; vol. 8, No. 2; Apr. 1, 1988.
Woontack Woo et al.; "Overlapped Block Disparity Compensation with Adaptive Windows for Stereo Image Coding" IEE Transactions on Circuits and Systems for Video Technology; vol. 10. No. 2; Mar. 1, 2000.
Kuo T et al.; "Adaptive Overlapped Block Motion Compensation"; Proceedings of the International Socieity for Optical Engineering ; SPIE, USA ; vol. 3164; Jan. 1, 1997.
Thomas Sikora; "The MPEG-4 Video Standard Verification Model"; IEEE Transactions on Circuits and Systems for Video Technology; IEEE Service Center; Piscataway, NJ, US.; vol. 7, No. 1; Feb. 1, 1997.

* cited by examiner

*Primary Examiner* — Yubin Hung
(74) *Attorney, Agent, or Firm* — Jack Schwartz & Associates, PLLC

(57) ABSTRACT

The present invention provides a method of adaptively selecting an optimal pixel block within an image frame. The method comprises the activity of selecting an optimal block size for fast and accurate motion estimation. The traditional block is extended into an overlapped region to form an extended pixel block. Statistical region information of the non-overlapped region and the overlapped region of the respective extended pixel block is then measured. The optimal block, either the standard (or smaller size) non-overlapped block or the boundary extended overlapped block, is then selected in response to the measured statistical region information.

14 Claims, 4 Drawing Sheets

ADAPTIVE OVERLAPPED BLOCK MATCHING FOR ACCURATE MOTION COMPENSATION

CROSS-REFERENCE TO RELATED APPLICATIONS

This is a non-provisional application of provisional application Ser. No. 60/615,989 filed Oct. 5, 2004.

FIELD OF THE INVENTION

The present invention relates to a motion compensation technique and, more specifically, to a system involving adaptive block matching.

BACKGROUND OF THE INVENTION

High quality video compression is a key enabling technology for digital multimedia transmissions. To illustrate the level of compression required for 2 hours of high quality video consider the following example. The raw data storage requirements for uncompressed CCIR-601, sampling ratio 4:2:2, serial digital video are approximately 20 megabytes per second. For a 120 minute movie, 144 Gigabytes of storage space are required to account for the video alone, neglecting the space needed for audio. Currently, even a DVD (Digital Versatile Disk) is incapable of storing 4.7 Gigabytes of data. A compression ratio of approximately 40:1 is required to fit the video data for a feature film as well as the audio and sub-titles on a single sided disk.

Generally, video sequences contain a significant amount of statistical and subjective redundancy within and between frames. The ultimate goal of video source coding is a bit-rate reduction for storage and transmission. This is done by exploring both statistical and subjective redundancies to encode a "minimum set" of information using entropy coding techniques. This results in a coded, compressed version of the source video data. Performance of a video coding depends on the redundancy contained in the image data as well as on the compression techniques used for coding. With practical coding schemes a trade-off exists between coding performance (high compression with sufficient quality) and implementation complexity. A common data reduction scheme is based upon the principle that temporal and spatial redundancy in motion pictures make up the majority of the perceived visual information. By comparing changes from a current frame and a successive frame and removing as much similar information as possible, data storage and transfer requirements for the motion picture media are reduced. Most changes between the target and reference image can be approximated as a translation of small image regions. Therefore a key technique called motion compensation prediction is used.

Successive video frames may contain similar objects in different positions. Motion estimation examines the movement of similar objects in successive images to obtain vectors representing the estimated motion. Motion compensation uses the idea of object movement to obtain a greater data compression. In interframe coding, motion estimation and compensation have become powerful techniques to eliminate the temporal redundancy caused by the high correlation between consecutive frames. Therefore, motion compensated prediction is widely used in high efficiency video codecs (e.g. MPEG video coding standards) as a prediction technique for temporal Differential Pulse Code Modulation (DPCM) coding.

Conceptually, motion compensation is based on the estimation of the motion of objects between video frames. If approximately all the elements in a video scene are spatially displaced, the motion between frames can be described as a limited number of motion parameters (i.e. by motion vectors for the translatory motion of points in objects). The best prediction of a motion parameter is a motion compensated prediction from a previously coded frame. The difference between the previous and current frame is known as a prediction error. Usually, prediction errors and motion vectors are transmitted to the receiver. However, encoding a prediction error and motion vector for each coded image pixel is generally neither desirable nor necessary. Since the spatial correlation between motion vectors is often high, it is sometimes assumed that one motion vector is representative for the motion of a "block" of pixels. Accordingly, images are usually separated into disjointed blocks. Each block contains numerous adjacent pixels within a region (e.g. 16×16 macroblock in MPEG standards) and a single motion vector which is estimated, coded and transmitted for the respective block. The displacement of the macroblock on both the vertical and horizontal plane is called a motion vector. After reducing the temporal redundancies between frames through motion compensation, differential coding is used to reduce the total bit requirement by transmitting the difference between the motion vectors of consecutive frames. In essence, only the prediction error images, the difference between original images and motion compensated prediction images, are encoded. The correlation between pixels in the motion compensated error images is more efficient than the correlation properties of single frames due to the prediction based on a previously coded frame. This error may be coded in a transform domain (e.g. DCT domain). After the transform, only few high frequency coefficients remain in the frequency domain. After the quantization process, the high frequencies only require a small number of bits for representation. Run-length encoding and Huffman encoding are used to encode the transform data into the final state.

In real video scenes, motion within a scene includes a complex combination of translation and rotation. Such translatory and rotation motion is difficult to estimate and may require large amounts of processing. However, translatory motion is easily estimated and has been used successfully for motion compensated coding. Therefore, prior art motion estimation algorithms make the following assumptions: That objects move in translation in a plane that is parallel to the camera plane (i.e., the effects of camera zoom, and object rotations are not considered), that illumination is spatially and temporally uniform and that occlusion of one object by another, and uncovered background are neglected.

There are two mainstream algorithms of motion estimation, the Pel-Recursive Algorithm (PRA) and the Block-Matching Algorithm (BMA). The PRA is an iterative refining of motion estimation for individual pixels using gradient methods. The BMA assumes that all pixels within a block have the same motion. The BMA estimates motion on the basis of rectangular blocks and produces one motion vector for each block. The PRA involves more computational complexity and less regularity than the BMA therefore making it normally slow and unstable. Therefore, the BMA is more suitable for practical use because of its regularity and simplicity.

The BMA divides each frame into non-overlapped blocks, each consisting of luminance and chrominance blocks. Motion estimation is only performed on the luminance block for coding efficiency. Each luminance block in the current frame is then matched against candidate blocks in a search area of the subsequent frame. These candidate blocks are merely versions of the original block temporarily displaced. Upon finding the best candidate block (lowest distortion, i.e., most matched), the displacement is recorded as a motion vector. In an interframe coder, the input frame is subtracted from the prediction of the reference frame to obtain a motion vector. Consequently the motion vector and the resulting error can be transmitted instead of the original luminance block. Therefore, the interframe coder using the BMA removes interframe redundancy and achieves data compression. In the receiver, the decoder builds the frame difference signal from the received data and adds it to the reconstructed reference frames. The more accurate the prediction, the smaller the error signal and hence the smaller the transmission bit rate.

However, the feedback loop for temporal prediction of traditional implementations, non-overlapped block video compression, requires conversion of images from the spatial domain to the transform domain (e.g. frequency domain in DCT transform) Due to principles of the lossy transform, information will be lost in the reconstructed frame which increases the prediction error and blocking effect. The blocking effect is the visual representation of images as blocks of pixels. When smaller pixel blocks are used, the blocking effect is less perceivable than when larger pixel blocks are used. The input information for the lossy transform is obtained from the motion estimation during the interframe compression of subsequent frames. Therefore, the accuracy of the motion compensation procedure directly affects the constructed video quality. Poor motion estimation accuracy will lead to poor video compression quality and a highly perceivable blocking effect.

Therefore, it is desirable to introduce a system which provides an improved motion estimation technique while preserving the quality of original video.

A system according to invention principles addresses these deficiencies and associated problems.

SUMMARY OF THE INVENTION

A method and system for selecting a pixel block within an image frame in accordance with invention principles. A pixel block processor selects a pixel block of a predetermined size within an image frame encompassing a plurality of pixel blocks and determines boundaries of an extended pixel block encompassing the selected pixel block and additional pixels of an overlapped region. Statistical information for the selected pixel block and the overlapped region are derived and one of the selected pixel block and the extended pixel block are selected in response to the derived statistical information.

A system involves selecting a pixel block within an image frame. The method includes the activity of adaptively selecting an optimal pixel block within an image frame. The method comprises the activity of selecting an optimal block size for a fast and accurate motion estimation. The traditional block is extended into an overlapped region to form an extended pixel block. Statistical region information of the non-overlapped region and the overlapped region of the respective extended pixel block is then measured. The optimal block, either the standard (or smaller size) non-overlapped block or the boundary extended overlapped block, is then selected in response to the measured statistical region information.

BRIEF DESCRIPTION OF THE DRAWING FIGURES

FIG. 2 is an illustrative view of statistical measured regions for the adaptive overlapped and non-overlapped block matching selections according to invention principles;

DETAILED DESCRIPTION OF THE INVENTION

Figure 1A:
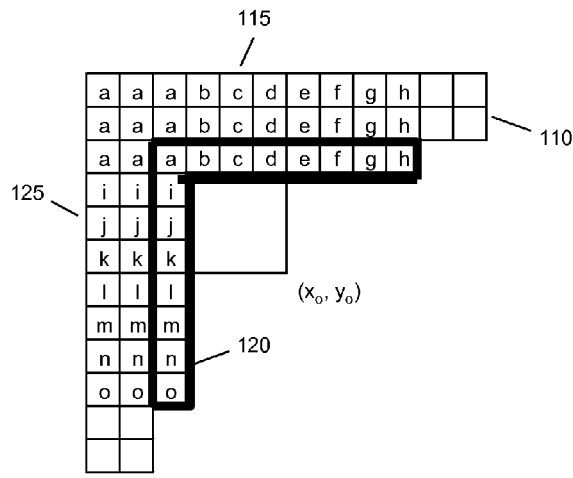
FIG. 1 is an illustrative view of 4 boundary extended blocks in 4 corners of a frame according to invention principles.

A system provides a solution for efficient and accurate motion estimation by introducing an Adaptive Overlapped Block Matching technique. This technique determines the optimal block size for pixel blocks which make up an individual frame of a motion picture. Block size, for overlapped and non-overlapped blocks, is determined by a comparison between a measure of statistical regional information from the overlapped portion of an overlapped block and a measure of statistical regional information from the non-overlapped area of the overlapped block.

With efficient data computing and precise motion estimation, the technique of utilized by the system provides a high video compression quality and a low blocking effect. This is very useful in various video compression applications such as Video Conferencing, high quality Video On Demand, real-time Video Surveillance, Internet TV Broadcasting, Wireless Multimedia Information Transmission, etc.

The system provides a method of adaptively selecting an optimal pixel block within an image frame. The method comprises the activity of selecting an optimal block size for fast and accurate motion estimation. The traditional block is extended into an overlapped region to form an extended pixel block. Statistical region information of the non-overlapped region and the overlapped region of the respective extended pixel block is then measured. The optimal block, either the standard (or smaller size) non-overlapped block or the boundary extended overlapped block, is then selected in response to the measured statistical region information A system relates to a motion compensation technique and, more specifically, to an Adaptive Overlapped Block Matching (AOBM) technique. In this technique a standard block of a currently processed frame is extended to create an overlapped block. Statistical information of regions within the non-overlapped area and within the extended area are then measured. Based on these measurements, new block sizes are chosen for motion estimation. This technique provides a more accurate and reliable motion compensation, choosing smaller pixel blocks for coding efficiency when large detail is present in a small region and large blocks for accuracy when little detail is present.

A system is provided herein for a block matching scheme. When an image is received, it will be divided into separate blocks. Different from the traditional non-overlapped blocks, larger size overlapped blocks or smaller size non-overlapped blocks are adaptively selected to realize Adaptive Block Matching. The overlapped block is formed by extending the boundary of non-overlapped block. And, two (2) regions in this large block are separated to analyze the statistic information distribution in the block.

The system begins by examining the data within two (2) regions of the boundary extended overlapped block. Certain characteristics (e.g. mean, variance) are then calculated for the pixels in a smaller size non-overlapped region. The value of variance can represent the statistic distribution of the information in the selected region. Similarly, the variance value is calculated for the extended overlapped region, which is given for measuring the statistic information distribution in the overlapped region. If the variance in the selected non-overlapped region is greater than the value in the extended region, then the non-overlapped region will have enough information to perform the motion estimation, and the system does not need to use a larger region to obtain enough information to perform the computation. If the variance in the smaller size non-overlapped region is smaller than the value in the extended region, then a larger size overlapped region will contain more information than the non-overlapped region thus providing a better motion estimation solution.

A method is provided for an adaptively selecting block matching scheme for motion compensation. By considering a larger area of block information than the traditional block, the boundary of traditional non-overlapped blocks are extended to cover regions in neighboring blocks. Statistical information for the 2 regions is then calculated, measuring the correlation of the data representing the detail content within the regions. The statistical information for both regions contributes to an adaptive overlapped block decision scheme. This scheme is adopted for an optimal non-overlapped and overlapped block selection. If the non-overlapped region contains less detail than the extended overlapped region then the overlapped blocks are selected. If the non-overlapped region contains an efficient amount of information (similar or more than the information in the extended area) then smaller (e.g. 8×8, or less) non-overlapped blocks are selected. This Adaptive Overlapped Block Matching technique can automatically select the optimal block size. The larger overlapped block is selected to increase the motion compensation accuracy. While, the smaller non-overlapped block is selected to reduce the motion estimation time and increase the computation efficiency.

A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. A Pixel is defined herein is the smallest element of a display which can be assigned a color. If your display is set to the maximum resolution, it is the smallest building block on the monitor. If your display is set to a lower resolution, it can be made up of several blocks to form each pixel. Statistical information as used herein is numerical data used in making comparisons of blocks of pixels and individual pixel characteristics. A motion vector as used herein refers to a predictive base for the current frame and/or macroblock from the reference frame and/or macroblock.

FIG. 1 is an illustrative view of four (4) boundary extended matching block in four (4) corners of a frame. The system includes a technique for determining the optimal block size for pixel blocks in individual frames of a motion picture. Block size, either an overlapped or non-overlapped block, is determined by comparing the statistical information measured in selected regions of the extended boundary of overlapped blocks and the statistical information measured in regions of the non-overlapped blocks. When the non-overlapped region contains less detail than the extended overlapped region, the overlapped block is chosen. When the non-overlapped region contains more information than the extended overlapped region, the non-overlapped block is chosen. Traditional non-overlapped blocks are square shaped and made up of 8×8 pixels while the larger block sizes are square shaped and made up of traditional blocks and an area of the traditional block extended by 2 pixels on each side to create a 12×12 pixel block. The use of a traditionally sized square is optimal for it allows for easier integration into common systems. However, it should be understood that the extended block may be of any shape and size. The overlapped area as used herein is defined by the extension of the traditional block. It should be understood that these size measurements are a preferred embodiment and that any sizes and extensions may be used in alternate embodiments. The boundary of the traditional block is identified by pixels 120 having a solid line around the squares forming the 8×8 traditional block. The point $(X_o, Y_o)$ is the center coordinate of the traditional block. If $(X_o-6)>0$, $(Y_o-6)>0$ and $(X_o+6)<I_x$, $(Y_o+6)<I_y$, wherein $I_x$ and $I_y$ are the horizontal and vertical size of the frame respectively, then the extended overlapped pixels are replaced with the adjacent pixels in the frame. If one of the previous tests is not encountered then the block has met a frame boundary, thus the traditional block 120 is extended by pixels 110 shown having a dotted line boundary.

Figure 1B:
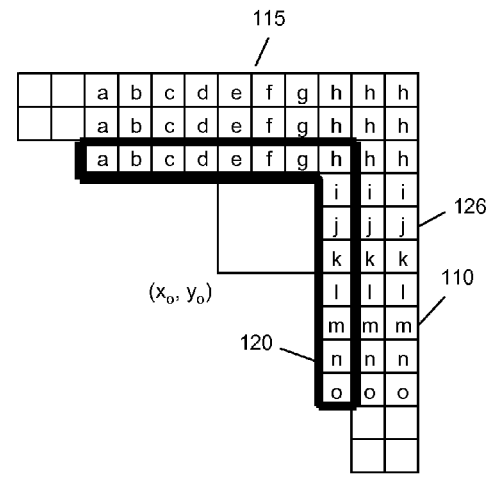
Figure 1C:
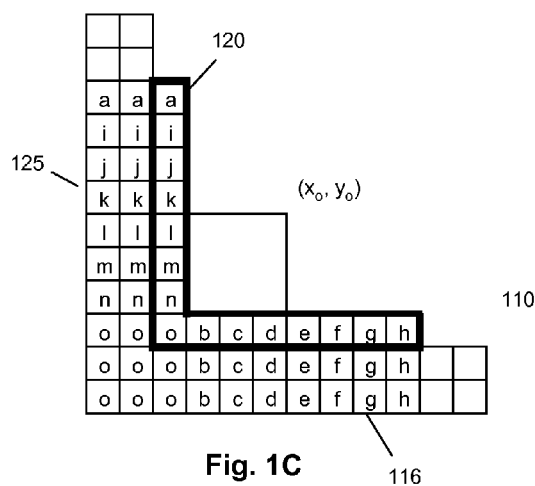
Figure 1D:
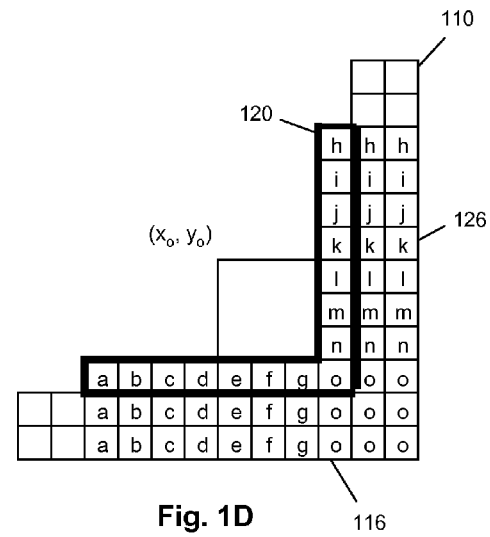

In the boundary area of frame, the values of the extended pixels in the overlapped area are replaced with the values of the nearest pixels of the traditional block. The top-side pixels 115 of FIGS. 1A and 1B (or bottom side 116 of FIGS. 1C and 1D) of the overlapped area 110 extend upwards a length of two pixels from the traditional block 120. Therefore, the nearest pixel of the traditional block will be the pixel of traditional block 120 which is two pixel lengths beneath it. Similarly, the left-side pixels 125 in FIGS. 1A and 1C (or right side 126 of FIGS. 1B and 1D) of the overlapped area 110 extend by the nearest horizontal boundary points in the traditional block 120 by a length of two pixels and its closest pixel of the traditional block lies two pixel lengths to its right. For example, the values of the two extended pixels above the pixel of the traditional boundary 120 labeled 'h' are replaced with the values measured for the pixel labeled 'h'. Similarly, the values of the two pixels to the left of the pixel of the traditional boundary 120 labeled 'm' are replaced with the values measured for the pixel labeled 'm'. Accordingly, FIG. 1B illustrates the block extension in the upper-right corner of the frame, FIG. 1C illustrates the block extension of the lower-left corner in the frame and FIG. 1D illustrates the block extension of the lower-right corner of the frame.

Figures 2A, 2B:
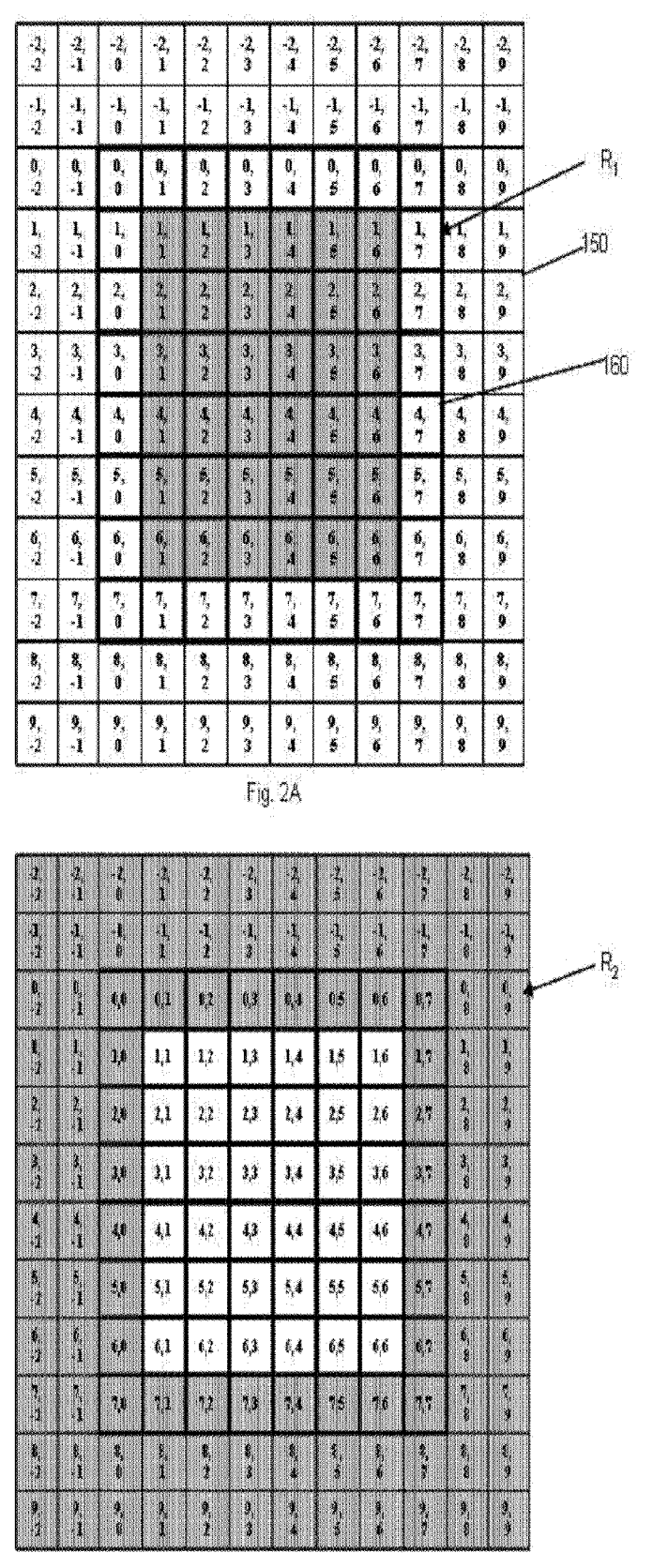

FIG. 2 is an illustrative view of statistical measured regions for the adaptive overlapped and non-overlapped block matching selections of the present invention. The coordinate system of the Adaptive Overlapped Block (AOB) is displayed by the information within each pixel. Let the original point (i.e. coordinate of the point is (0,0)) to be the point of the upper-left corner of traditional non-overlapped block. Then, the dotted area 150 (x<0, or y<0, or x>7, or y>7) represents the overlapped region of AOB. The solid area 160 represents the non-overlapped region of AOB. The shaded region in FIG. 2A is $R_1$, the shaded region in FIG. 2B is $R_2$, $N_1$ as the pixel number in region $R_1$, $N_2$ as the pixel number in region $R_2$, $X_1$ as the set in which the pixels belong to $R_1$ (i.e. $X_1=\{X_{1i} \in R_1, 0<i \leq N_1\}$), and $X_2$ as the set in which the pixels belong to $R_2$ (i.e. $X_2=\{X_{2i} \in R_2, 0<i \leq N_2\}$).

Then, the variance of the elements in set $X_1$ is $$\sigma_1 = 1/N_1 \sum_{i=1}^{N_1} (X_{1i} - m_1)^2 \quad (1)$$

and the variance of the elements in set $X_2$ is $$\sigma_2 = 1/N_2 \sum_{i=1}^{N_2} (X_{2i} - m_2)^2 \quad (2)$$

wherein, $m_1$ is the mean of set $X_1$ and $m_2$ is the mean of set $X_2$ $$m_1 = 1/N_1 \sum_{i=1}^{N_1} (X_{1i}) \quad (3)$$

$$m_2 = 1/N_2 \sum_{i=1}^{N_2} (X_{2i}) \quad (4)$$

The Adaptive Overlapped Block decision scheme can be described as follows: If $\sigma_2 < \lambda_1 \sigma_1$, then region $R_1$ ($1 <= x <= 6$, $1 <= y <= 6$) non-overlapped block matching is used; If $\sigma_2 > \lambda_2 \sigma_1$, then region $R_2 + R_1$ ($-2 <= x <= 9$, $-2 <= y <= 9$) overlapped block matching is used; and If $\lambda_1 \sigma_1 < \sigma_2 < \lambda_2 \sigma_1$ then 8×8 region ($0 <= x <= 7$, $0 <= y <= 7$) non-overlapped block matching is used. Wherein, parameters $\lambda_1, \lambda_2$ are selected as: $0 < \lambda_1 < 1$, $\lambda_2 > 1$ (e.g. $\lambda_1 = 0.8$, $\lambda_2 = 1.2$).

The adaptive technique described above selects block sizes to make a more efficient and accurate motion compensation. If region $R_1$ contains much less information than region $R_2$ (i.e. $\sigma_2 > \lambda_2 \sigma_1$), overlapped blocks are selected increasing the accuracy of motion compensation. While, if region $R_1$ contains more information than region $R_2$ (i.e. $\sigma_2 < \lambda_1 \sigma_1$), smaller size non-overlapped blocks are selected reducing the search complexity and increasing the efficiency of block matching. Otherwise, the traditional 8×8 block is selected for block matching.

Figure 3:
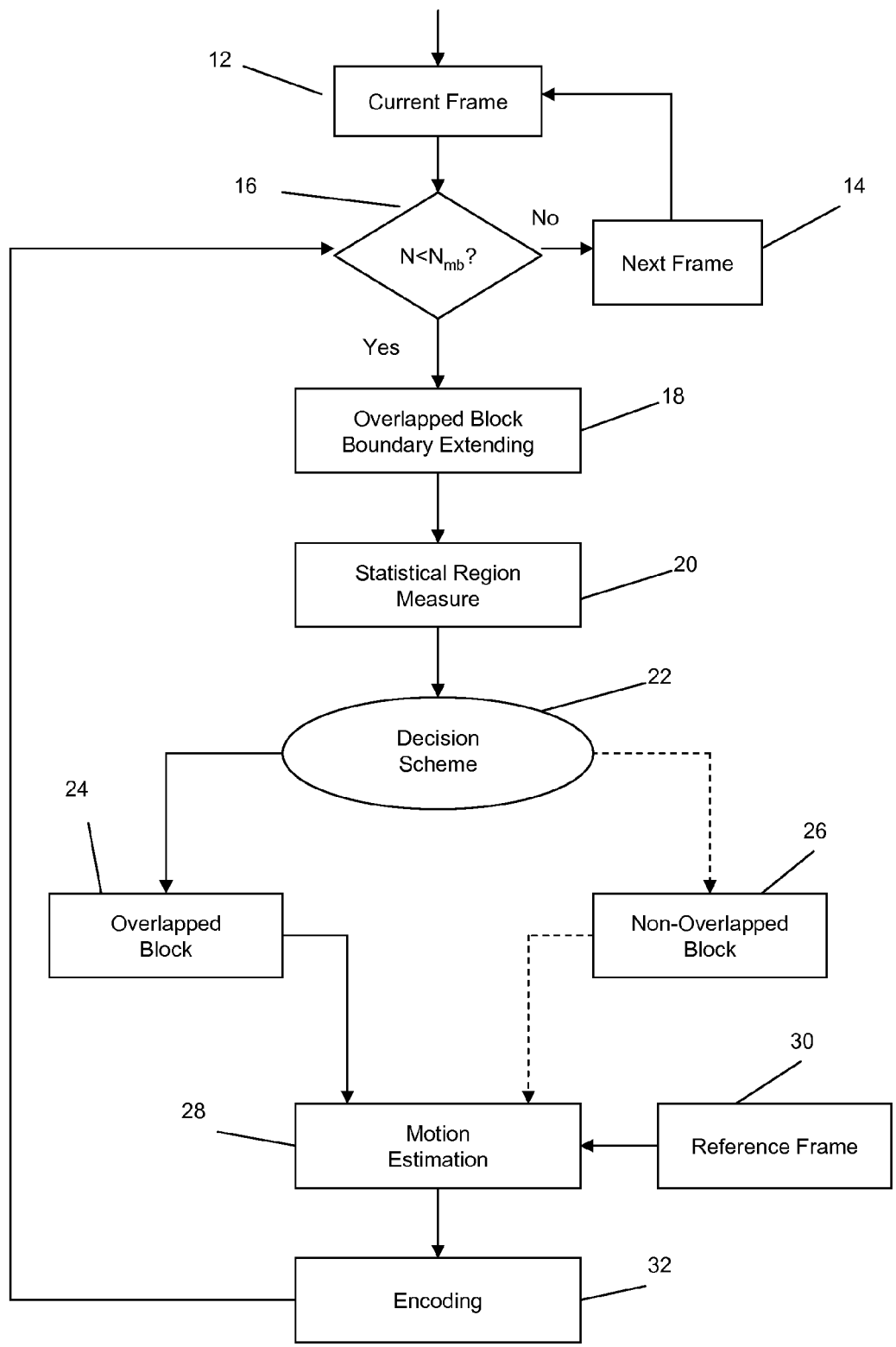
FIG. 3 is an illustrative view of a flow diagram of the Adaptive Overlapped Block Matching process according to invention principles.

FIG. 3 is an illustrative view of a flow diagram of the Adaptive Overlapped Block Matching process of the present invention. A current frame is input to be encoded in step 12 and is divided into pixel blocks having distinct numbers. Step 16 tests if all the pixel blocks from the current frame have been processed by comparing the number of the pixel block N to the number of total pixel blocks $N_{mb}$ encoded in each frame. If all pixel blocks have been encoded and there is no pixel block left to encode, then the process proceeds to the next frame in step 14. If a pixel block is available from the current frame encoded in step 12 then the pixel block's boundaries are extended to create an overlapped block, as illustrated in step 18. In a preferred embodiment, the block size is extended 2 more pixels in radius to cover the overlapped area for testing as shown above with specific reference to FIGS. 1 and 2. This larger area of information, which includes the traditional non-overlapped pixel block information and the overlapped information from the adjacent neighboring block, is then processed in step 20 by calculating statistical region information regarding statistical features from the selected regions for measuring the distribution properties, such as the means and variances, of the elements in the regions using the equations such as Equations (1), (2), (3) and (4) discussed above. An Adaptive Overlapped Block decision scheme exhibited in step 22 then makes an optimal block selection. The blocks are adaptively chosen for efficient and accurate block matching. If the non-overlapped region has less detail than the extended region, the overlapped block from step 24 is selected. If the non-overlapped region has enough information, which is approximately equal to or greater than the information in the extended area, the smaller (i.e. less or equal to 8×8) non-overlapped blocks in step 26 are selected. The smaller block size variations in step 26 provide a reduction in computing time by using a smaller set of data to calculate the SAD (Sum of Absolute Difference) while the larger block size variations in step 24 provide an increase in matching accuracy by counting more information for motion estimation. Together, the block variations create a more efficient block matching technique than the traditional non-overlapped block matching technique. The data representing the chosen block is then calculated along with data representing its reference frame, retrieved in step 30, for motion estimation in step 28. Motion estimation as displayed in step 28 can use a global searching (i.e. 3-step searching) or step-by-step searching (i.e. diamond searching). In a preferred embodiment a prediction-based diamond search is used for fast motion estimation. Once motion estimation is calculated in step 28 the resulting information is encoded in step 32 and the process returns to process new blocks in step 16.

Figure 4:
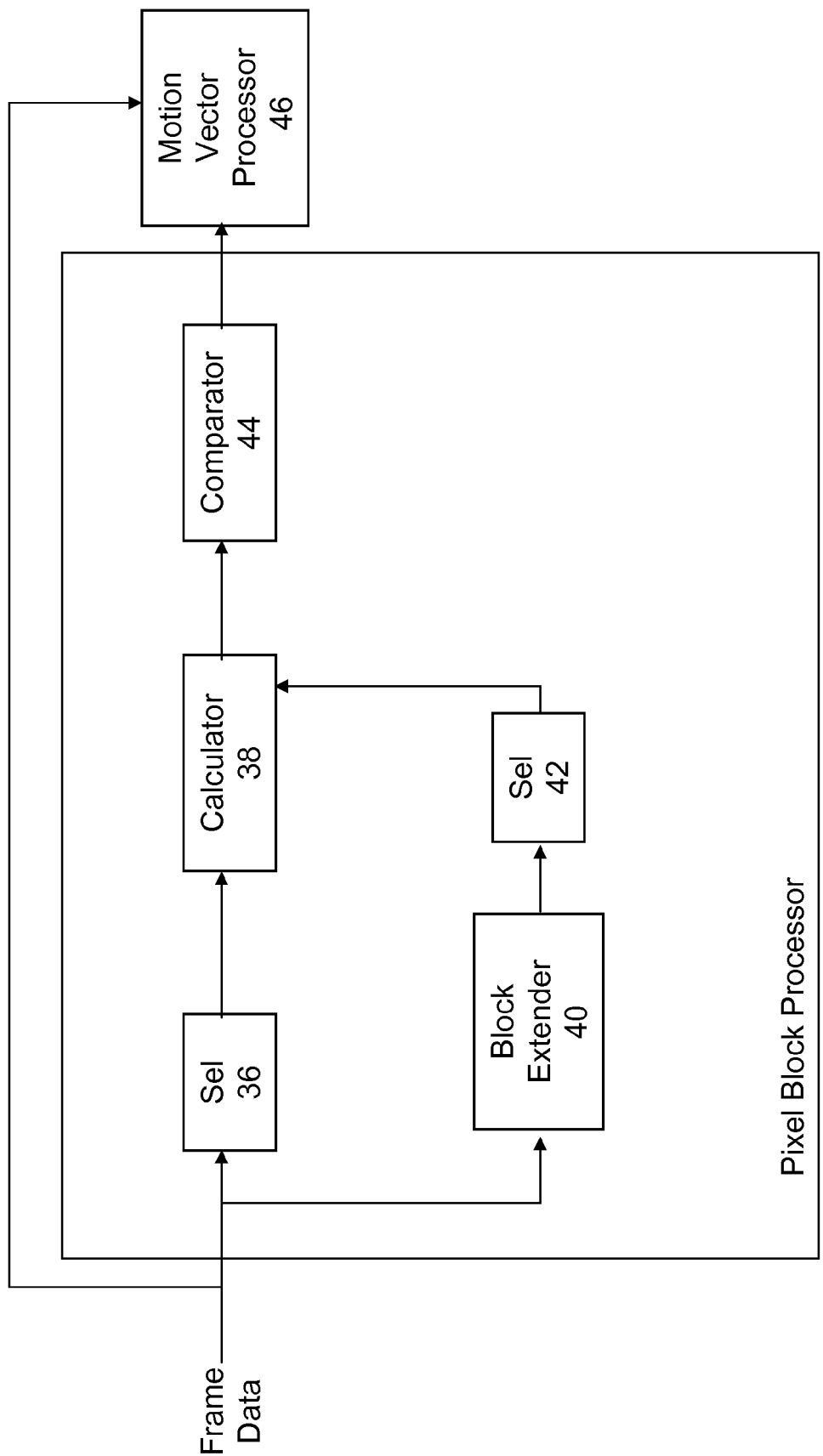
FIG. 4 is an illustrative view of a block diagram of the Adaptive Overlapped Block Matching system according to invention principles.

FIG. 4 is an illustrative view of a block diagram of the Adaptive Overlapped Block Matching system of the present invention. Frame data is input into Pixel Block Processor 34 and motion vector processor 46. Pixel Block Processor 34 processes the frame data to indicate to the motion vector processor 46 the grouping of the enclosed pixels as either belonging to a traditionally sized or smaller sized pixel block or an extended larger sized pixel block. The first selector 36 selects pixels from the frame data of the input frame belonging to a non-overlapped region. These pixels are then input into the calculator 38. Calculator 38 determines the variance of selected region, which represents the statistic characteristic of this region. Block extender 40 extends the forwarded size of the traditional block by a predetermined length and height to create an extended pixel block. This measurement, as well as the frame data, is forwarded to the second selector 42. The second selector 42 then selects pixels belonging to the extended pixel block. This selection allows for the calculator 38 to process the pixels belonging to an overlapped region in this extended block. Calculator 38 then determines the variance value of this region, representative of the statistic characteristic of the overlapped region. The variance values calculated for the non-overlapped area as well as the overlapped area are then forwarded to comparator 44. Comparator 44 determines the adaptive block size by comparing the difference between the variance. Comparator 44 then selects the traditional non-overlapped block or the smaller size non-overlapped block or the large size overlapped block based on the determination result. This selection is then sent to motion vector processor 46. Motion processor 46 is then able to calculate motion vectors to the block indicated by comparator 44.

What is claimed is:

1. A system for selecting a pixel block within an image frame for use in motion estimation and embodied in a video encoder for encoding a video data stream, comprising:
  a pixel block processor for,
    selecting a pixel block of a predetermined size within an image frame encompassing a plurality of pixel blocks;
    determining boundaries of an extended pixel block encompassing the selected pixel block and additional pixels of an overlapped region;
    deriving statistical information for said selected pixel block and statistical information for said additional pixels of said overlapped region; and
    selecting said selected pixel block when said derived statistical information for said additional pixels of said overlapped region has a value less than a product of the derived statistical information of said selected pixel block and a first parameter having a value between zero and one; and selecting said extended pixel block when said derived statistical information for said additional pixels of said overlapped region has a value greater than a product of the derived statistical information of said selected pixel block and a second parameter having a value greater than one.

2. A system according to claim 1, wherein said pixel block processor derives said statistical information for said selected pixel block and said additional pixels of said overlapped region by, calculating a measurement of statistical information including the measurement of distribution properties within said selected pixel block and said additional pixels of said overlapped region, said calculated measurement is at least one of a variance and mean of said pixels within said selected first pixel block.

3. A system according to claim 2, wherein said pixel block processor includes a comparator for comparing the derived statistical information of said selected pixel block and said derived statistical information of said additional pixels of said overlapped region, and selecting a pixel block in a subsequent image frame corresponding to one of said selected pixel block and said extended pixel block based upon the comparison.

4. A system according to claim 3, further comprising a motion vector processor, said motion vector processor receiving said image frame and said one of the selected pixel block and said extended pixel block within the image frame and assigning motion vectors to said pixel block selected in said subsequent image frame.

5. A system according to claim 1, wherein said pixel block processor selects a pixel block containing said selected pixel block and contained within said extended pixel block when a value of said derived statistical information for said overlapped region has a value that is greater than the product of the derived statistical information of said selected pixel block and said first parameter and less than the product of the derived statistical information of said selected pixel block and a second parameter.

6. A method of selecting a pixel block within an image frame, said method comprising the activities of:

selecting a pixel block of a predetermined size within an image frame encompassing a plurality of pixel blocks;

determining boundaries of an extended pixel block encompassing the selected pixel block and additional pixels of an overlapped region;

deriving statistical information for said selected pixel block and said overlapped region; and selecting said selected pixel block when said derived statistical information for said additional pixels of said overlapped region has a value less than a product of the derived statistical information of said selected pixel block and a first parameter having a value between zero and one; and selecting said extended pixel block when said derived statistical information for said additional pixels of said overlapped region has a value greater than a product of the derived statistical information of said selected pixel block and a second parameter having a value greater than one.

7. The method of selecting a pixel block of claim 6, wherein the statistical information includes the measurement of distribution properties and is at least one of mean and variance of pixels within the selected pixel block and the additional pixels of the overlapped region.

8. A method according to claim 6, further comprising the activity of selecting a pixel block containing said selected pixel block and contained within said extended pixel block when a value of said derived statistical information for said additional pixels of said overlapped region has a value that is greater than the product of the derived statistical information of said selected pixel block and said first parameter and less than the product of the derived statistical information of said selected pixel block and a second parameter.

9. The method of selecting a pixel block of claim 6 further comprising the activity of copying the information of the selected pixel block within the image frame into the additional pixels of the overlapped region if the block reaches the boundary of frame.

10. The method of selecting a pixel block of claim 6, wherein the selected block is a non-overlapped block with the predetermined size is less or equal to standard size of a macro block.

11. The method of selecting a pixel block of claim 6 further comprising the activity of receiving a second image frame.

12. The method of selecting a pixel block of claim 11, wherein said second image frame is one of a previous or subsequent frame of the image frame sequence.

13. The method of selecting a pixel block of claim 11, wherein said image frames are divided into multiple standard non-overlapped pixel blocks.

14. The method of selecting a pixel block of claim 13, wherein an overlapped pixel region encompasses pixels belonging to one standard non-overlapped pixel block and additional pixels of neighboring standard non-overlapped pixel blocks.

* * * * *